US008320698B2

(12) United States Patent
Baqai

(10) Patent No.: US 8,320,698 B2
(45) Date of Patent: Nov. 27, 2012

(54) SYSTEM AND METHOD FOR DENOISING USING SIGNAL DEPENDENT ADAPTIVE WEIGHTS

(75) Inventor: Farhan A. Baqai, Fremont, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1103 days.

(21) Appl. No.: 12/284,055

(22) Filed: Sep. 18, 2008

(65) Prior Publication Data

US 2010/0067821 A1     Mar. 18, 2010

(51) Int. Cl.
    *G06K 9/40*     (2006.01)
(52) U.S. Cl. ......... 382/261; 382/254; 382/260; 382/275
(58) Field of Classification Search .................. None
See application file for complete search history.

(56) References Cited

U.S. PATENT DOCUMENTS

| | | | |
|---|---|---|---|
| 6,718,068 B1* | 4/2004 | Gindele et al. | 382/254 |
| 2005/0110876 A1* | 5/2005 | Baqai et al. | 348/222.1 |
| 2005/0135700 A1* | 6/2005 | Anderson | 382/261 |
| 2005/0244052 A1* | 11/2005 | Keshet et al. | 382/162 |
| 2005/0259886 A1* | 11/2005 | Shan | 382/260 |
| 2006/0056722 A1* | 3/2006 | Moroney | 382/266 |
| 2007/0140587 A1* | 6/2007 | Wong et al. | 382/275 |

FOREIGN PATENT DOCUMENTS

EP     1601184 B1     2/2008

OTHER PUBLICATIONS

Mona Mahmoudi and Guillermo Sapiro, "Fast Image and Video Denoising via Nonlocal Means of Similar Neighborhoods", Dec. 2005, IEEE Signal Processing Letters, vol. 12, No. 12, pp. 839-842.*
Alexey Lukin, "A Multiresolution Approach for Improving Quality of Image Denoising Algorithms", 2006, IEEE International Conference on Acoustics, Speech and Signal Processing, pp. 857-860.*

* cited by examiner

*Primary Examiner* — Andrew W Johns
*Assistant Examiner* — Siamak Harandi
(74) *Attorney, Agent, or Firm* — Gregory J. Koerner; Redwood Patent Law

(57) ABSTRACT

A system and method for denoising using signal dependent adaptive weights includes an imaging device that captures image data corresponding to a photographic target. A denoising manager identifies similar pixels from said image data that are located within a pre-defined processing window around the pixel to be denoised. The denoising manager computes signal-dependent weighting values that correspond to respective ones of the similar pixels. The denoising manager then calculates the denoised pixel value by utilizing the weighting values in conjunction with raw pixel values of the similar pixel set. In this manner all pixels in the image are denoised.

20 Claims, 12 Drawing Sheets

612

| Lookup table | |
|---|---|
| Pixel Value A | Variance A | 740(a)
| Pixel Value B | Variance B | 740(b)
| ... | ... |
| Pixel Value N | Variance N | 740(n)
| | |

420          FIG. 7

Denoised Pixel Estimate

$$\hat{x} = \frac{1}{N}\sum_{i=1}^{\omega} a_i y_i$$

| Method | Parameters | Weights | Constraint |
|---|---|---|---|
| Current | $N = \omega$ (number of similar pixels) <br> $a_i = 1$ | Fixed | Estimate's mean equal to noise-free value |
| New | $N = \dfrac{1}{1/\sigma_1^2 + \cdots + 1/\sigma_\omega^2}$ <br> $a_i = \dfrac{1}{\sigma_i^2}$ | Signal-dependent Adaptive | 1) Estimate's mean equal to noise-free value <br> 2) Its variance is minimized (LMVU estimator) |

FIG. 8B

SYSTEM AND METHOD FOR DENOISING USING SIGNAL DEPENDENT ADAPTIVE WEIGHTS

BACKGROUND SECTION

1. Field of the Invention

This invention relates generally to techniques for processing image data, and relates more particularly to a system and method for denoising using signal dependent adaptive weights.

2. Description of the Background Art

Implementing effective methods for processing image data is a significant consideration for designers and manufacturers of contemporary electronic devices. However, effectively processing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced processing operations may provide additional benefits to a system user, but may also place increased demands on the control and management of various device components. For example, an enhanced electronic device that effectively processes digital image data may benefit from an effective implementation because of the large amount and complexity of the digital data involved. One particular area of image processing is the denoising of image data. Noise is a significant problem in many imaging products. This is especially true in low-light imaging environments.

Due to growing demands on system resources, substantially increasing data magnitudes, and image denoising requirements, it is apparent that developing new techniques for processing image data is a matter of concern for related electronic technologies. Therefore, for all the foregoing reasons, developing effective systems for processing image data remains a significant consideration for designers, manufacturers, and users of contemporary electronic devices.

SUMMARY

In accordance with the present invention, a system and method are disclosed for performing an image denoising procedure using signal dependent adaptive weights. In one embodiment, a denoising manager accesses image data from any appropriate data source for performing the image denoising procedure. The denoising manager selects a target pixel for denoising. The denoising manager defines a processing window around the selected target pixel. The denoising manager next identifies pixels within the processing window that are similar to the target pixel according to any effective criteria. For example, the denoising manager may require similar pixel values to be within a predefined range of the target pixel value of the selected target pixel. In another embodiment, similar pixels could be the ones for which a distance metric between the said pixel and the target pixel is below a pre-defined threshold.

The denoising manager then determines the respective noise variance values of the similar pixels within the processing window by utilizing any effective techniques. For example, in certain embodiments, the denoising manager obtains the noise variance values from a previously-created lookup table that is based upon a corresponding noise model which relates pixel signal value to the noise variance at that pixel location. The denoising manager then computes respective signal-dependent weighting values for the similar pixels in any appropriate manner. For example, in certain embodiments, a weighting value may be equal to the reciprocal from a variance value of a corresponding pixel.

Next, the denoising manager applies the weighting values to corresponding raw pixel values of the similar pixels to compute a denoised pixel value for the target pixel. In certain embodiments, the denoised pixel value is equal to an averaged summation of each raw similar pixel value multiplied by a corresponding weighting value. This procedure is applied to all pixels in the image. Once all pixels have been denoised, then the process may terminate. The present invention therefore provides an improved system and method for performing denoising using signal dependent adaptive weights.

BRIEF DESCRIPTION OF THE DRAWINGS

FIG. 7 is a diagram of the lookup table of FIG. 4, in accordance with one embodiment of the present invention;

FIGS. 8A-8B are diagrams contrasting a prior method and a new method for performing an image denoising procedure, in accordance with a one embodiment of the present invention.

DETAILED DESCRIPTION

The present invention relates to an improvement in image data processing techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for denoising using signal dependent adaptive weights, and includes an imaging device that captures image data corresponding to a photographic target. A denoising manager identifies similar pixels from said image data that are located within a pre-defined processing window around the pixel to be denoised. The denoising manager computes signal-dependent weighting values that correspond to respective ones of the similar pixels. The denoising manager then calculates the denoised pixel value by utilizing the weighting values in conjunction with raw pixel values of the similar pixel set. In this manner all pixels in the image are denoised.

Figure 1:
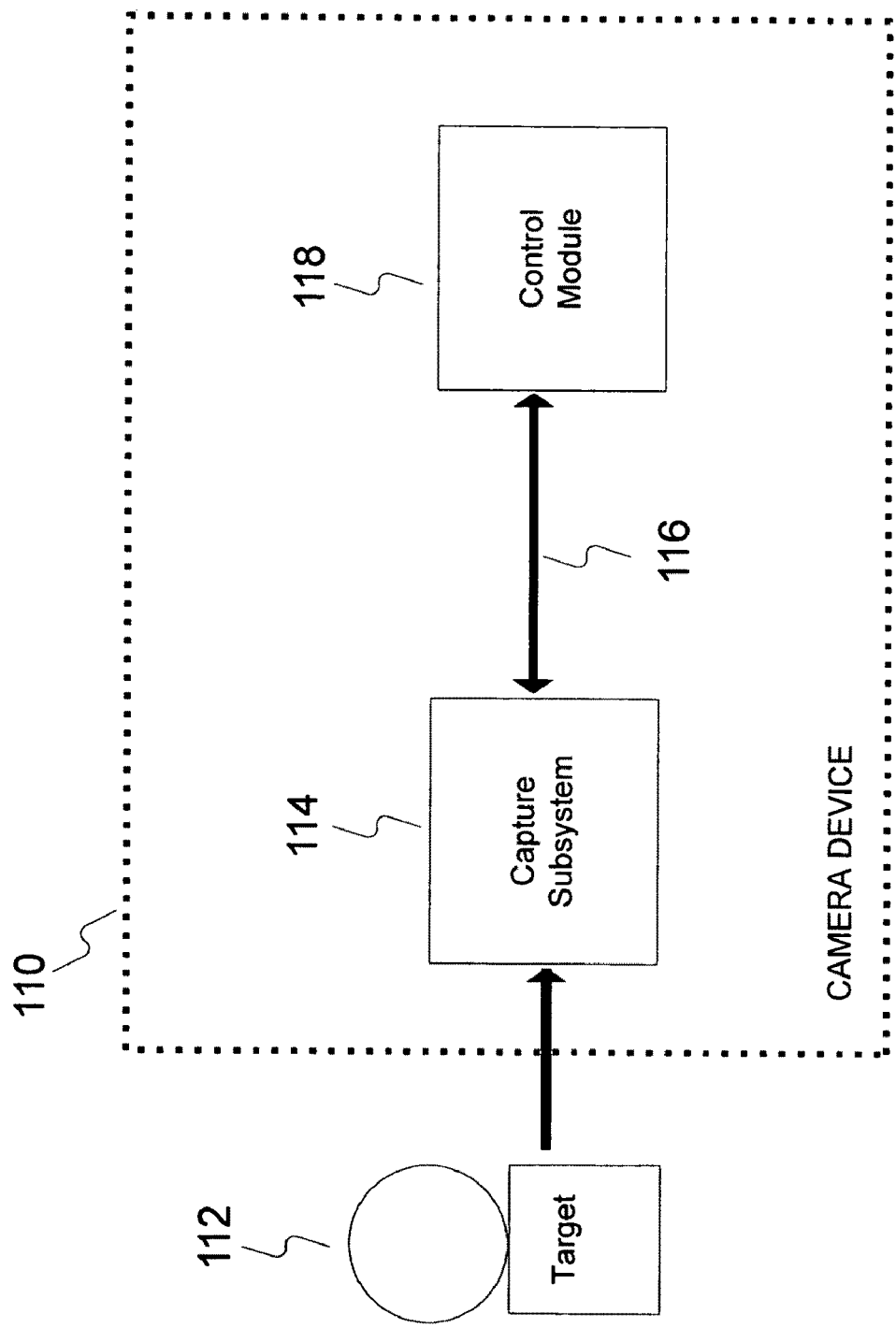
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may include other components in addition to, or instead of, certain of those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once a system user has focused capture subsystem 114 on target 112 and requested camera device 110 to capture image data corresponding to target 112, then control module 118 may instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
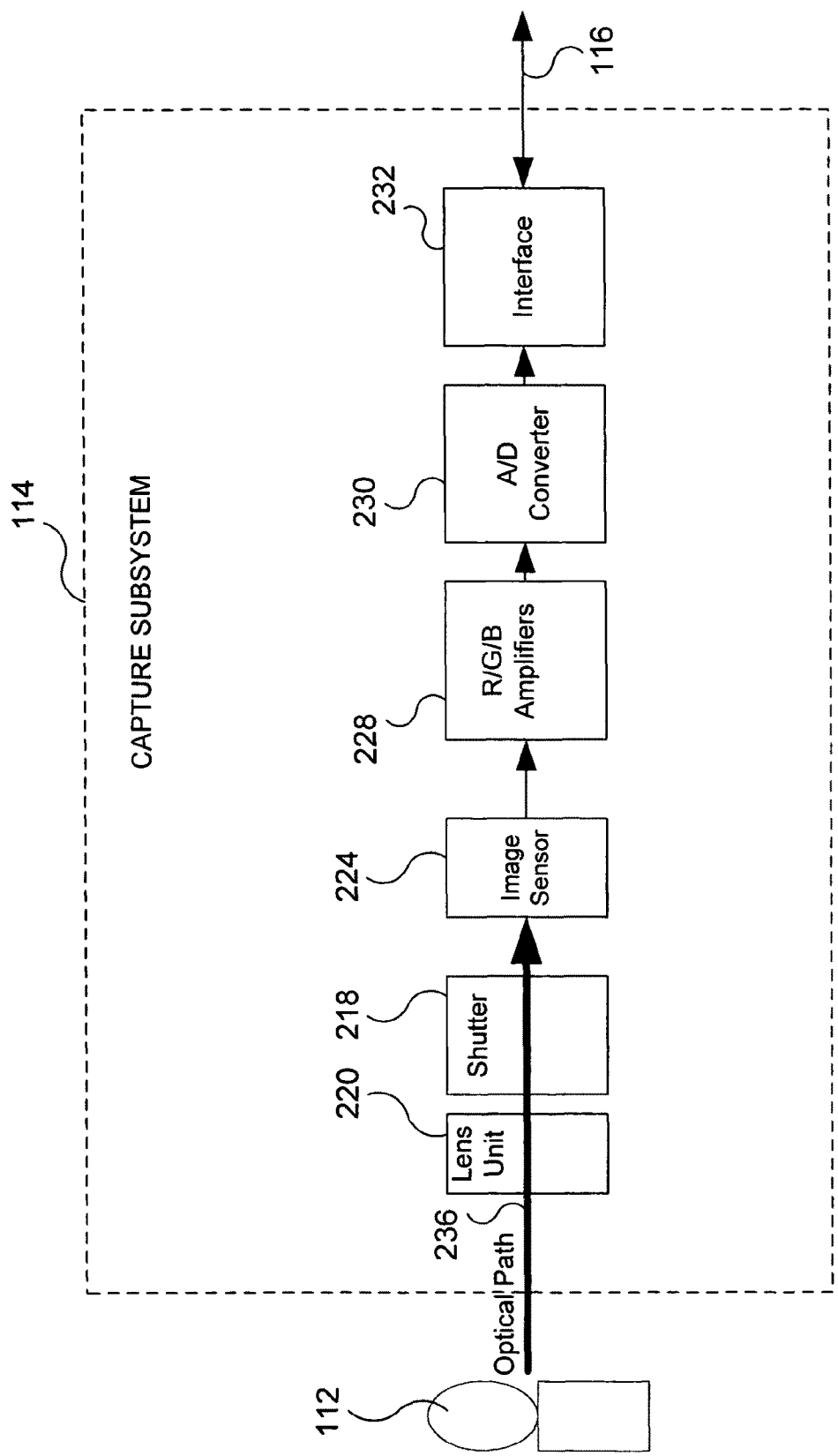
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 comprises, but is not limited to, a shutter 218, a lens unit 220, an image sensor 224, red, green, and blue (R/G/B) amplifiers 228, an analog-to-digital (A/D) converter 230, and an interface 232. In alternate embodiments, capture subsystem 114 may readily include other components in addition to, or instead of, certain those components discussed in conjunction with the FIG. 2 embodiment.

In the FIG. 2 embodiment, capture subsystem 114 captures image data corresponding to target 112 via reflected light impacting image sensor 224 along optical path 236. Image sensor 224, which may include a charged-coupled device (CCD) or a CMOS device, may responsively generate a set of image data representing the target 112. The image data may then be routed through red, green, and blue amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention.

Figure 3:
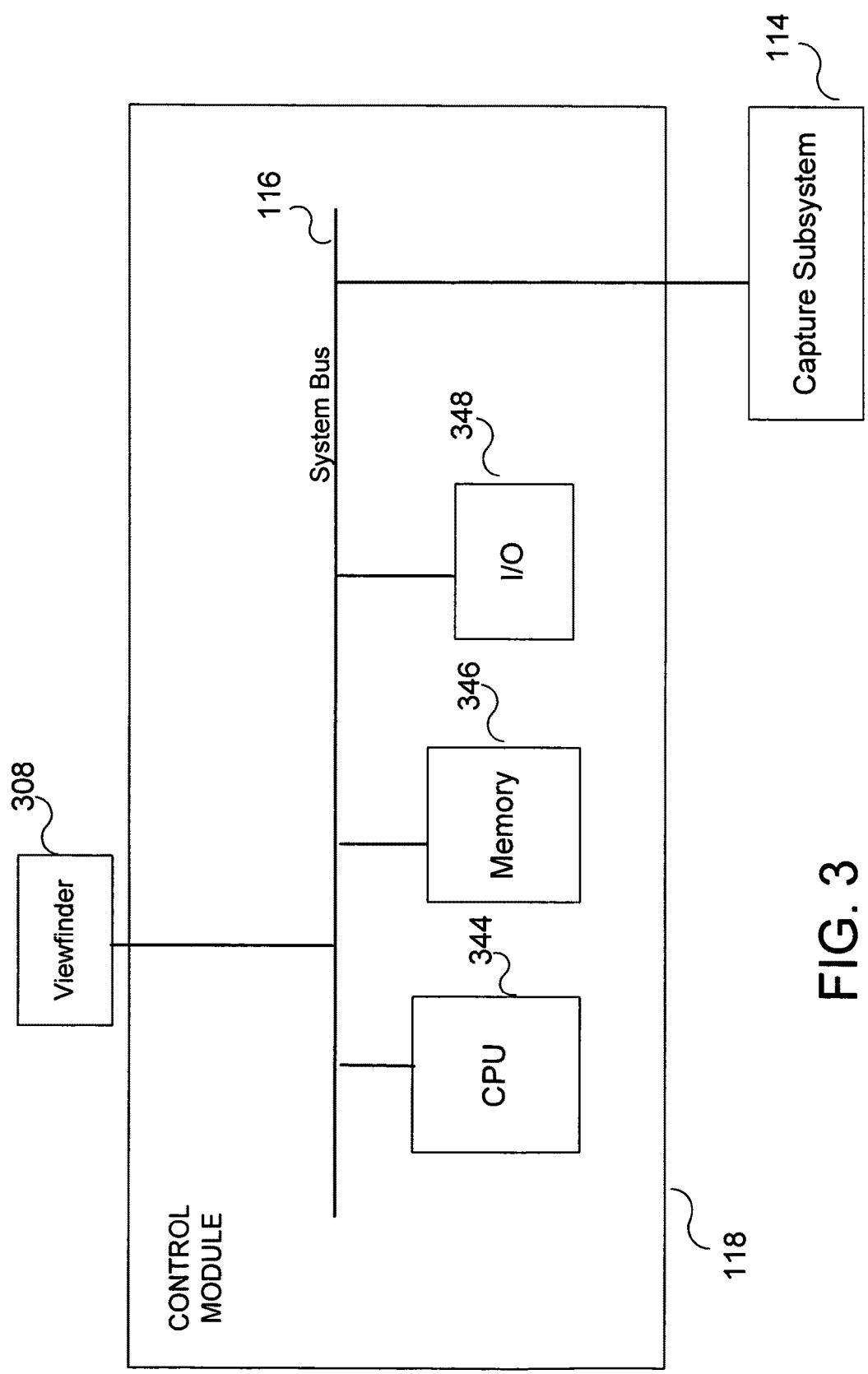
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 includes, but is not limited to, a viewfinder 308, a central processing unit (CPU) 344, a memory 346, and one or more input/output interface(s) (I/O) 348. Viewfinder 308, CPU 344, memory 346, and I/O 348 are each coupled to, and communicate, via common system bus 116 that also communicates with capture subsystem 114. In alternate embodiments, control module 118 may include other components in addition to, or instead of, certain of those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices.

Figure 4:
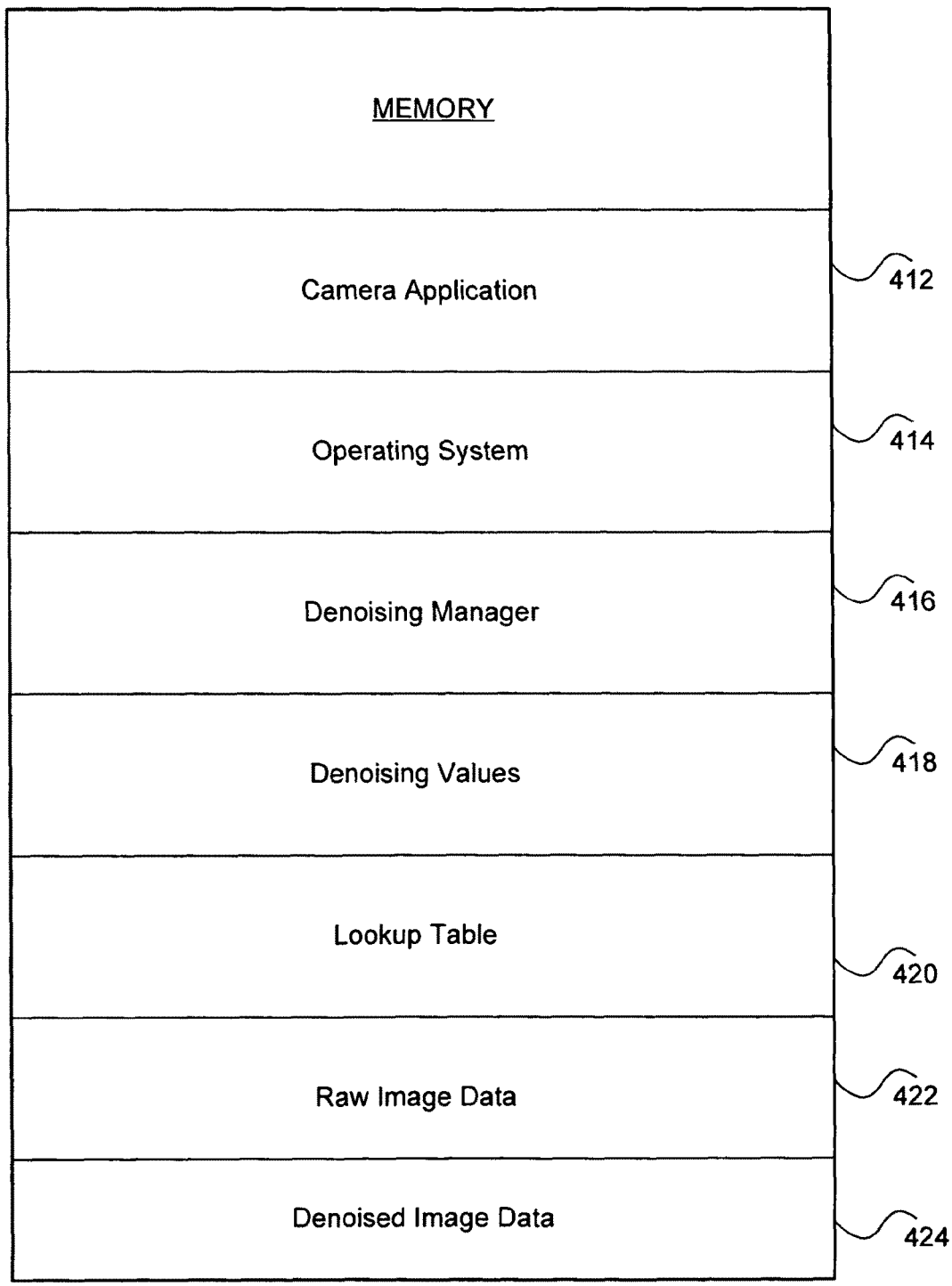
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a denoising manager 416, denoising values 418, a lookup table 420, raw image data 422, and denoised image data 424. In alternate embodiments, memory 346 may readily include various other components in addition to, or instead of, those components discussed in conjunction with the FIG. 4 embodiment.

In the FIG. 4 embodiment, camera application 412 may include program instructions that are executed by CPU 344 (FIG. 3) to perform various functions and operations for camera device 110. The particular nature and functionality of camera application 412 varies depending upon factors such as the type and particular use of the corresponding camera device 110. In the FIG. 4 embodiment, operating system 414 preferably controls and coordinates low-level functionality of camera device 110.

In accordance with the present invention, denoising manager 416 may control and coordinate an image denoising procedure for utilizing denoising values 418 and lookup table 420 to convert raw image data 422 into denoised image data 424. The utilization of denoising manager 416 to perform image denoising procedures is further discussed below in conjunction with FIGS. 5-9.

Figure 5A:
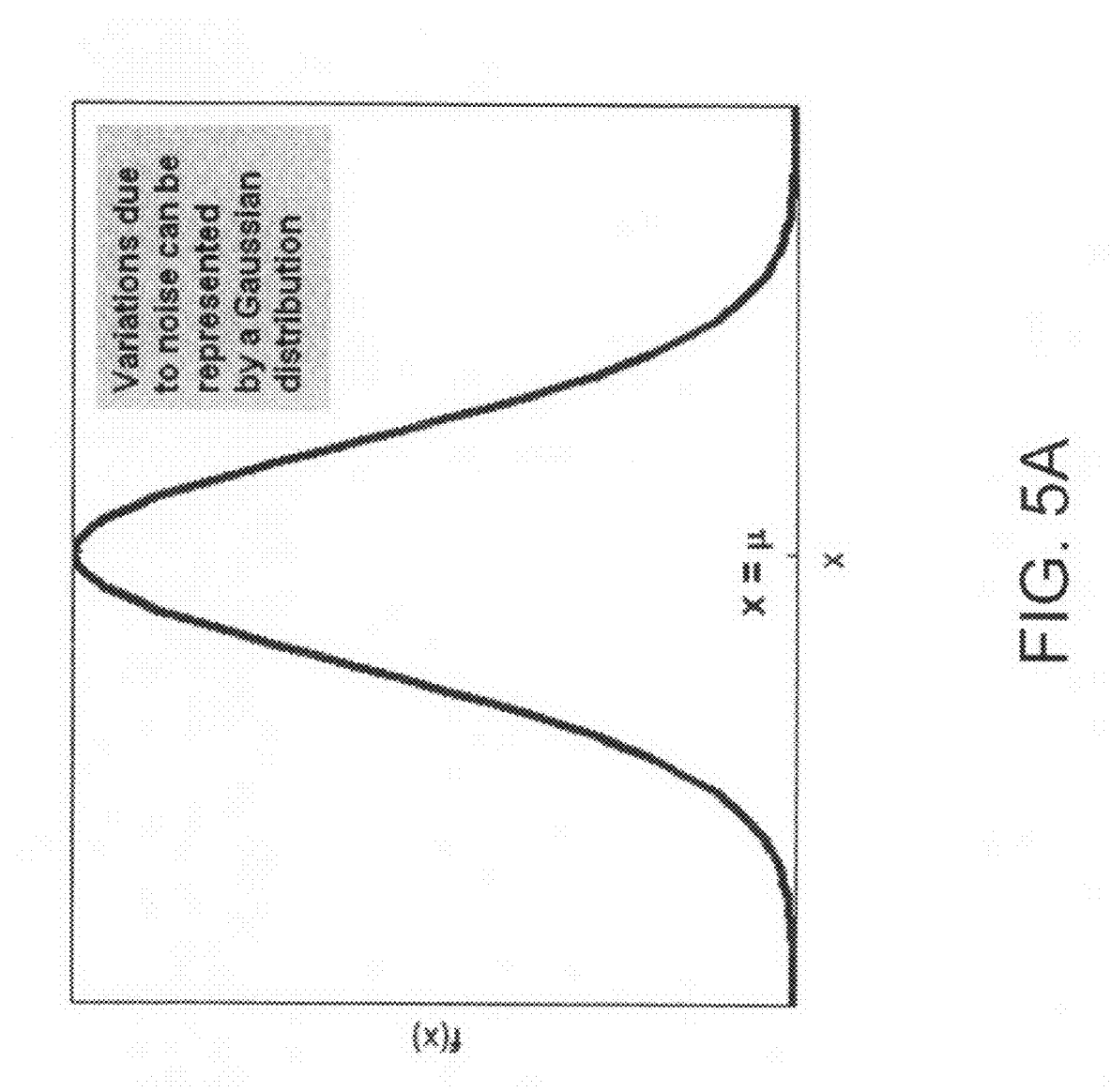
FIGS. 5A and 5B are graphs illustrating noise distribution characteristics, in accordance with one embodiment of the present invention.

Referring now to FIG. 5A, a graph illustrating a noise distribution is shown, in accordance with one embodiment of the present invention. The FIG. 5A diagram is presented for purposes of illustration, and in alternate embodiments, other noise distributions or parameters are possible in addition to, or instead of, certain of those distributions or parameters shown in the FIG. 5A example.

Figure 5B:
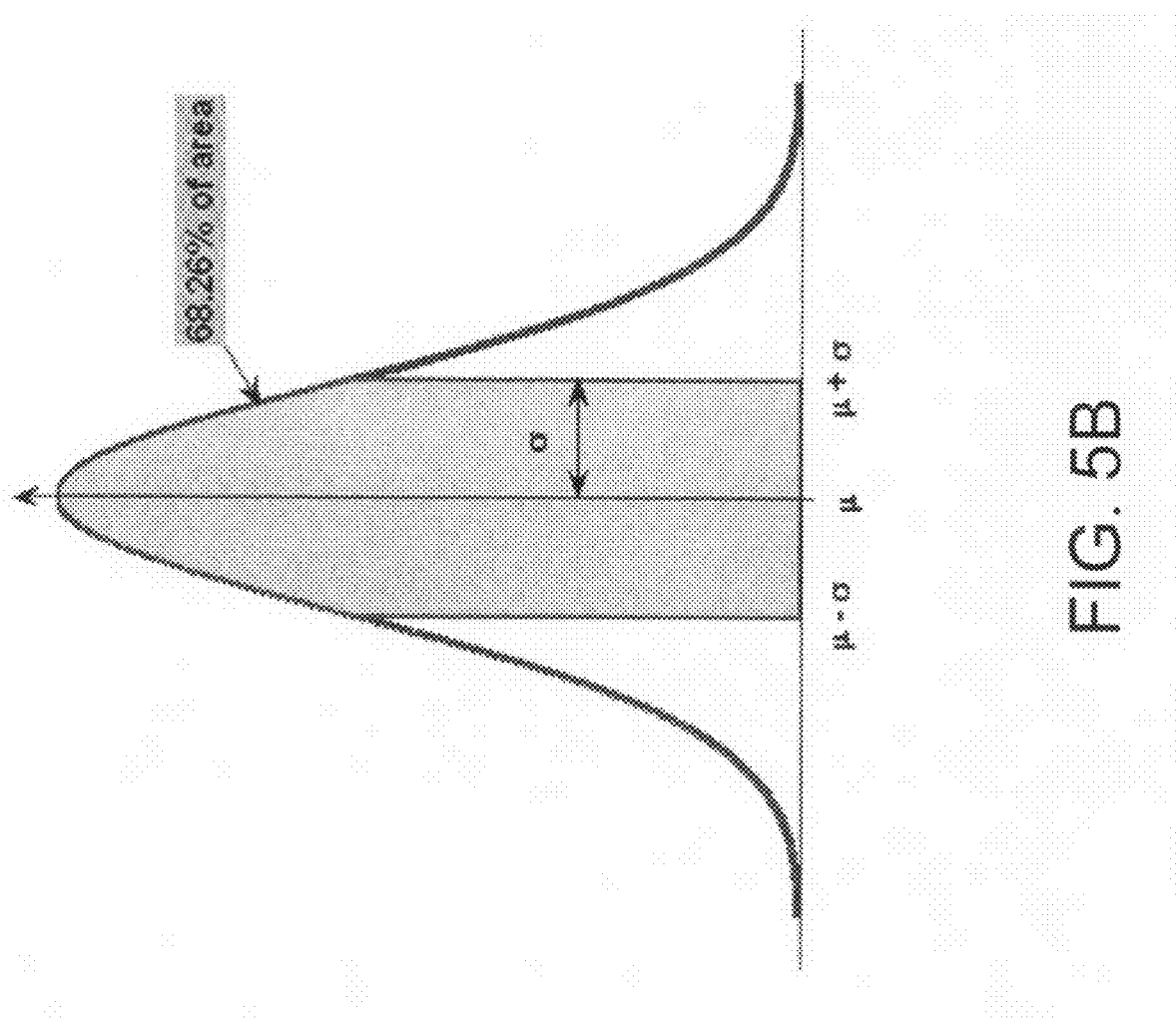

In the FIG. 5B graph, a bell curve depicts noise distribution for a given image. A mean value is shown at axis 514. A distance on either side of the mean value that covers 68.26 percent of the area under the curve may be defined as a deviation value. A variance value may then be defined as the deviation value raised to the second power (squared). Further details regarding the present invention's utilization of variance values is discussed below in conjunction with FIGS. 8 and 9.

Figure 6:
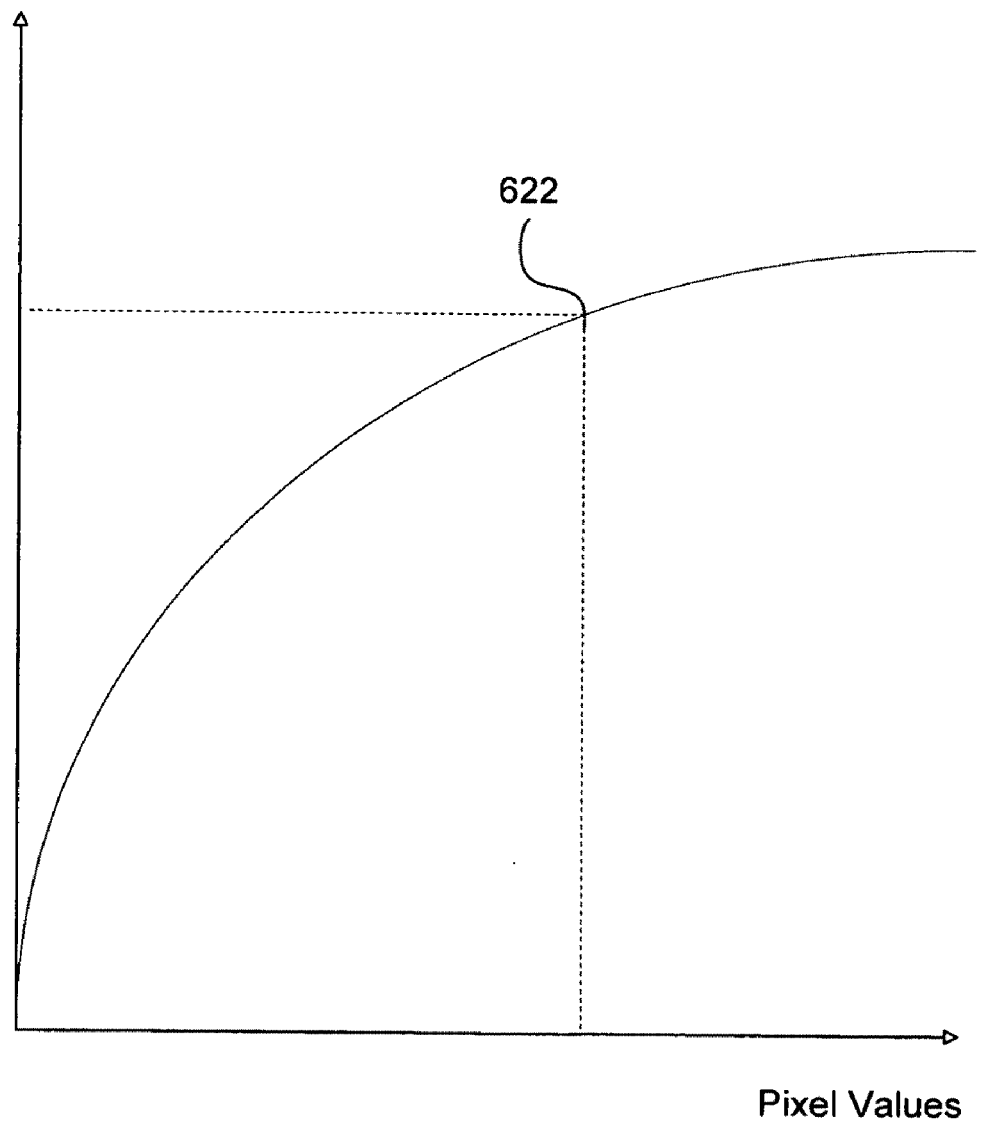
FIG. 6 is a diagram illustrating a noise model, in accordance with one embodiment of the present invention.

Referring now to FIG. 6, a diagram illustrating a noise model 612 is shown, in accordance with one embodiment of the present invention. The FIG. 6 example is presented for purposes of illustration, and in alternate embodiments, the present invention may utilize noise models with various other configurations and elements.

In the FIG. 6 example, noise model 612 displays variance values on a vertical axis and raw pixel values on a horizontal value. Noise model 612 is represented by a noise model curve that plots the relationship of the variance values to corresponding pixel values. In the FIG. 6 example, an intersection point 622 on the noise model curve shows how to locate a variance value for a given pixel value. Noise models 612 may be utilized to create a lookup table 420 (FIG. 4) for readily obtaining variance values to calculate weighting values for performing denoising procedures. One implementation of lookup table 420 is further discussed below in conjunction with FIG. 7.

Referring now to FIG. 7, a diagram of the FIG. 4 lookup table 420 is shown, in accordance with one embodiment of the present invention. The FIG. 7 embodiment is presented for purposes of illustration, and in alternate embodiments, lookup table 420 may be implemented with elements and configurations in addition to, or instead of, certain of those elements and configurations discussed in conjunction with the FIG. 7 embodiment.

In the FIG. 7 embodiment, lookup table 420 includes a series of table entries 740(a) and 740(b) through 740(n) that include pixel values which are linked with corresponding variance values. For example, a first entry 740(a) shows a pixel value A that is associated with a variance A. In certain embodiments, denoising manager 416 (FIG. 4) may access lookup table 420 to obtain variance values for performing image denoising procedures in accordance with the present invention.

Figure 8A:
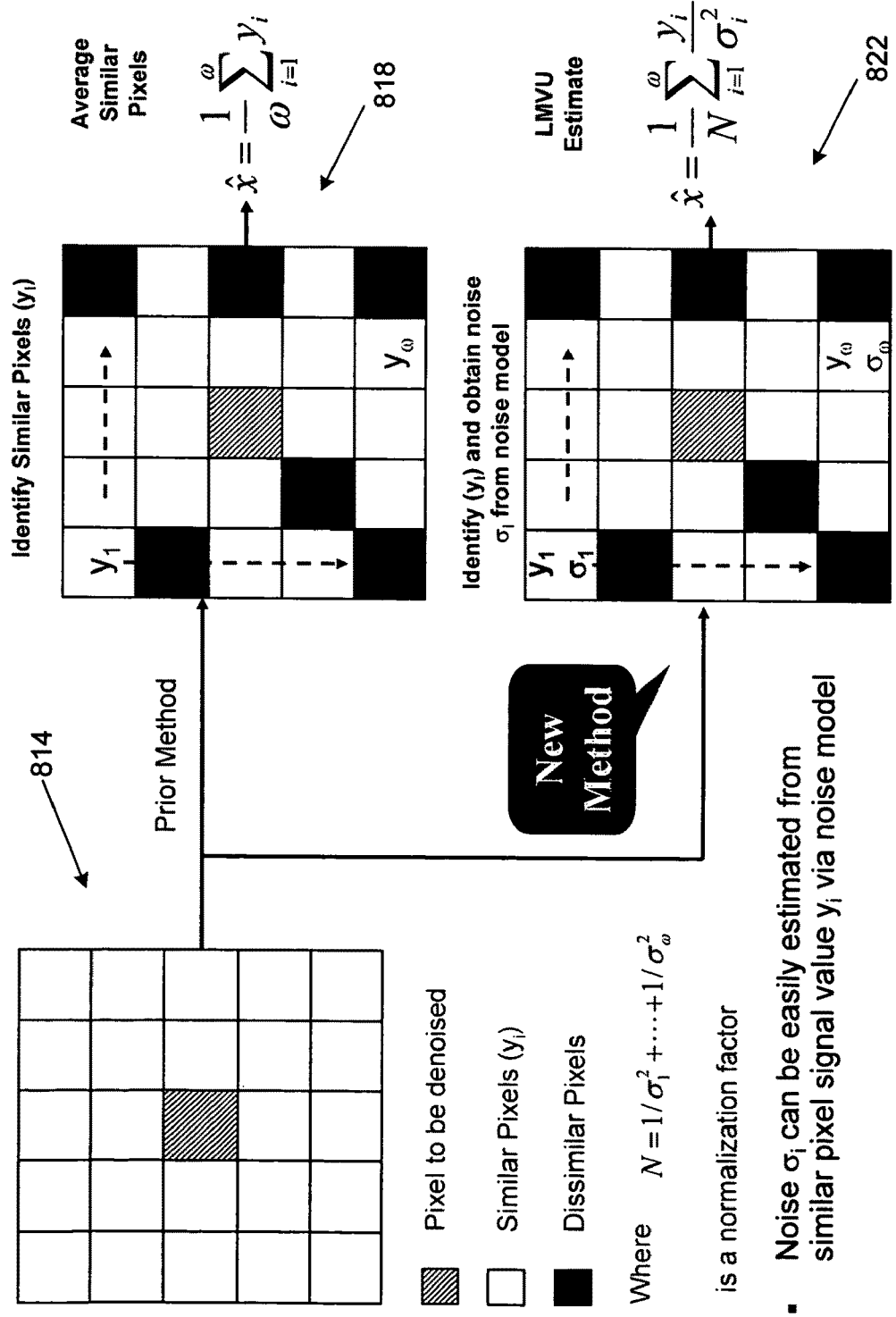

Referring now to FIGS. 8A-8B, diagrams contrasting a prior method and a new method for performing image denoising procedures are shown, in accordance with a one embodiment of the present invention. The FIG. 8 embodiments are presented for purposes of illustration, and in alternate embodiments, the present invention may readily utilize various other steps and techniques than those discussed in conjunction with the FIG. 8 embodiment.

In the FIG. 8A example, a pixel window 814 is shown with squares representing individual adjacent pixels in an array that is five pixels wide and five pixels high (any desired number of pixels may be utilized). A center target pixel is designated for a denoising procedure. A pixel window 818 illustrates a conventional prior method for denoising the target pixel, and a pixel window 822 illustrates an improved new method for denoising the target pixel, in accordance with the present invention.

In prior pixel-based and patch-based methods, similar pixels are simply averaged to obtain the denoised target pixel (i.e. all pixels in the similar pixel set are given equal weight). An intrinsic assumption with the prior approach is that similar pixels have same noise variances as the target pixel to be denoised (center pixel). Although the noise variances of similar pixels and the center pixel may indeed be similar, depending on noise level, there will be some fluctuation. Instead of assuming noise at similar pixel locations to be from the same distribution as the noise at the center target pixel, it is more accurate to consider the noise amount at similar pixel positions to be different from the noise level at the center target pixel. Weighting techniques such as kernel techniques are based on distance. They diminish the impact of distant pixels but ignore noise fluctuations within similar pixels.

The prior conventional approach of averaging similar pixels assumes that noise variances of similar-pixels are the same as the noise variance of the center target pixel. This assumption is not true, making the estimate of the denoised target pixel sub-optimal. Mean-squared error (MSE) is one way to assess the denoising estimator quality. It can be shown that MSE decomposes into a sum of two terms, the squared bias and the variance. As the estimator is modified so that one term increases, typically the other term will decrease. This is called the bias-variance tradeoff. In general, direct minimization of MSE leads to non-realizable estimators. An alternative is to find an un-biased (zero bias) estimator that produces the minimum variance. If bias is zero, then MSE is just variance and the estimator becomes a Minimum Variance Unbiased Estimator (MVUE).

Noting that the data model of the present invention is linear, to obtain an estimator that is simple to implement, the present invention utilizes linear MVUE. The denoised target pixel value is considered to be a weighted sum of similar pixels. The signal-dependent weights are determined so that the denoised target pixel estimate is linear, minimum variance, and un-biased (LMVU). Using a Lagrange multiplier technique, the present invention provides that the similar pixel weights that produce a LMVU estimate are the reciprocals of the noise variances at the respective similar pixels. The noise variance at each similar pixel location may be readily obtained from the noise model 612 (FIG. 6). According to the present invention, weights adaptively change based on noise amount at similar pixel locations. The noise level at each location depends on the corresponding pixel signal value.

In the prior conventional method shown in window 818, it is assumed that noise variances of similar pixels (yi) are equal to the noise variance of the target pixel to be denoised (center pixel). The prior signal model is shown by a formula:

$$y_i = x + n$$

where x is the noise-free pixel value, $n \sim N(0, \sigma)$ is the independent, zero mean noise of standard deviation $\sigma$, $i=1, \ldots, w$, and w is the number of similar pixels.

The estimate of the denoised pixel is expressed by a formula:

$$\hat{x} = \frac{1}{\omega} \sum_{i=1}^{\omega} y_i \quad (1)$$

Here, an implicit condition is shown by a formula:

$$E\{\hat{x}\} = x$$

where E indicates an expected value.

In accordance with the LMVU estimation method of the present invention, noise variances of similar pixels (yi) are considered to be different from the noise variance of the center target pixel. The new signal model is therefore expressed by a formula:

$$y_i = x + n_i$$

where x is the noise-free pixel value, $n_i \sim N(0, \sigma i)$ is the independent, zero mean noise of variance $\sigma_i^2$ at similar pixel location i, $i=1, \ldots, w$, and w is the number of similar pixels.

The present invention seeks to determine the LMVU estimate of the denoised pixel x by finding weighting constants $\alpha_i$ such that the sum $$\hat{x} = \alpha_1 y_1 + \ldots + \alpha_\omega y_\omega \quad (2)$$

is a Random Variable (RV) with a mean expressed by a formula:

$$E\{\hat{x}\} = \alpha_1 E\{y_1\} + \ldots + \alpha_\omega E\{y_\omega\} = x$$

and its variance $$V = \alpha_1^2 \sigma_1^2 + \ldots + \alpha_\omega^2 \sigma_\omega^2$$

is minimum. In addition to the implicit condition that the mean of the estimate equals the noise-free pixel value, another constraint is added such that the variance of the estimate is minimized.

Therefore, our problem is to minimize the variance V subject to the following constraint:

$$\alpha_1 + \ldots + \alpha_\omega = 1 \quad (3)$$

If weights $\alpha_i$ are non-negative, then the constraint in formula (3) above makes the denoised target pixel a convex combination of similar pixels.

To solve the foregoing problem, the present invention uses a Lagrange multiplier technique. Details of utilizing Lagrange multipliers may be found at http://en.wikipedia.org/wiki/Lagrange_multipliers. For any $\lambda$ (Lagrange multiplier), the Lagrangian function may be written with the formula:

$$V = \alpha_1^2 \sigma_1^2 + \ldots + \alpha_\omega^2 \sigma_\omega^2 - \lambda(\alpha_1 + \ldots + \alpha_\omega - 1)$$

V is minimum if the following conditions are satisfied:

$$\frac{\partial' V}{\partial \alpha_i} = 2\alpha_i \sigma_i^2 - \lambda = 0 \quad (4)$$

$$\alpha_i = \frac{\lambda}{2\sigma_i^2}$$

Substituting formula (4) in formula (3), the following formula results:

$$\frac{\lambda}{2} = V = \frac{1}{1/\sigma_1^2 + \ldots + 1/\sigma_\omega^2} \quad (5)$$

Similarly substituting formula (4) in formula (2), the following formula results:

$$\hat{x} = \frac{\lambda}{2}(y_1/\sigma_1^2 + \ldots + y_\omega/\sigma_\omega^2)$$

Based upon the foregoing, the LMVU estimate of the denoised target pixel may be expressed by the following formula:

$$\hat{x} = \frac{y_1/\sigma_1^2 + \ldots + y_\omega/\sigma_\omega^2}{1/\sigma_1^2 + \ldots + 1/\sigma_\omega^2} \quad (6)$$

Otherwise expressed in FIG. 8B as:

$$\hat{x} = \frac{1}{N} \sum_{i=1}^{\omega} \frac{y_i}{\sigma_i^2} \quad (7)$$

Note that the weight corresponding to each similar pixel is equal to the reciprocal of the noise variance at that pixel. Weights adaptively change based on similar pixels around the target pixel to be denoised. These signal-dependent weights, at each similar pixel location, may be determined via the corresponding noise model 612 (FIG. 6).

Figure 9A:
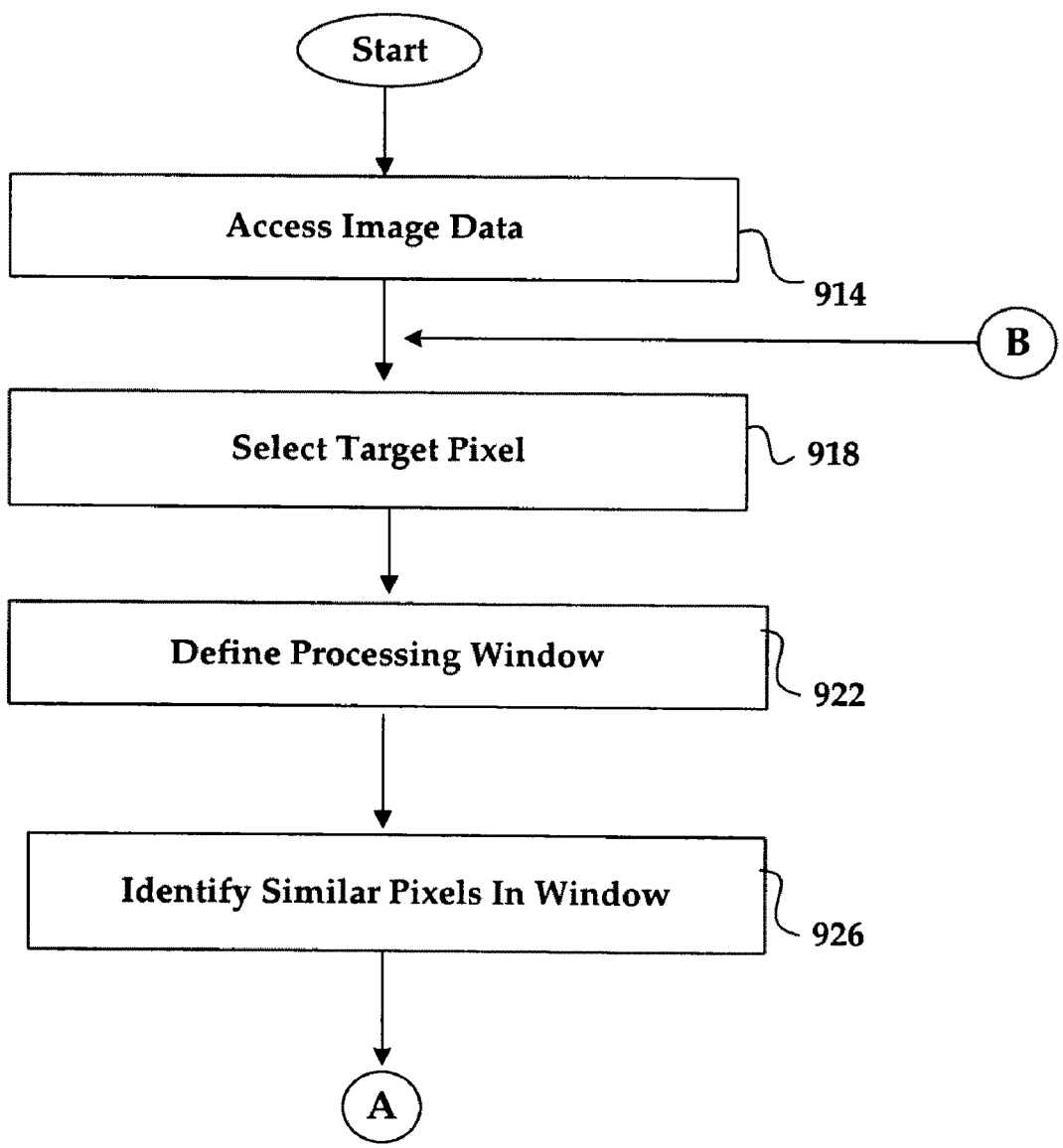
FIGS. 9A-9B are a flowchart of method steps for performing an image denoising procedure, in accordance with a one embodiment of the present invention.
Figure 9B:
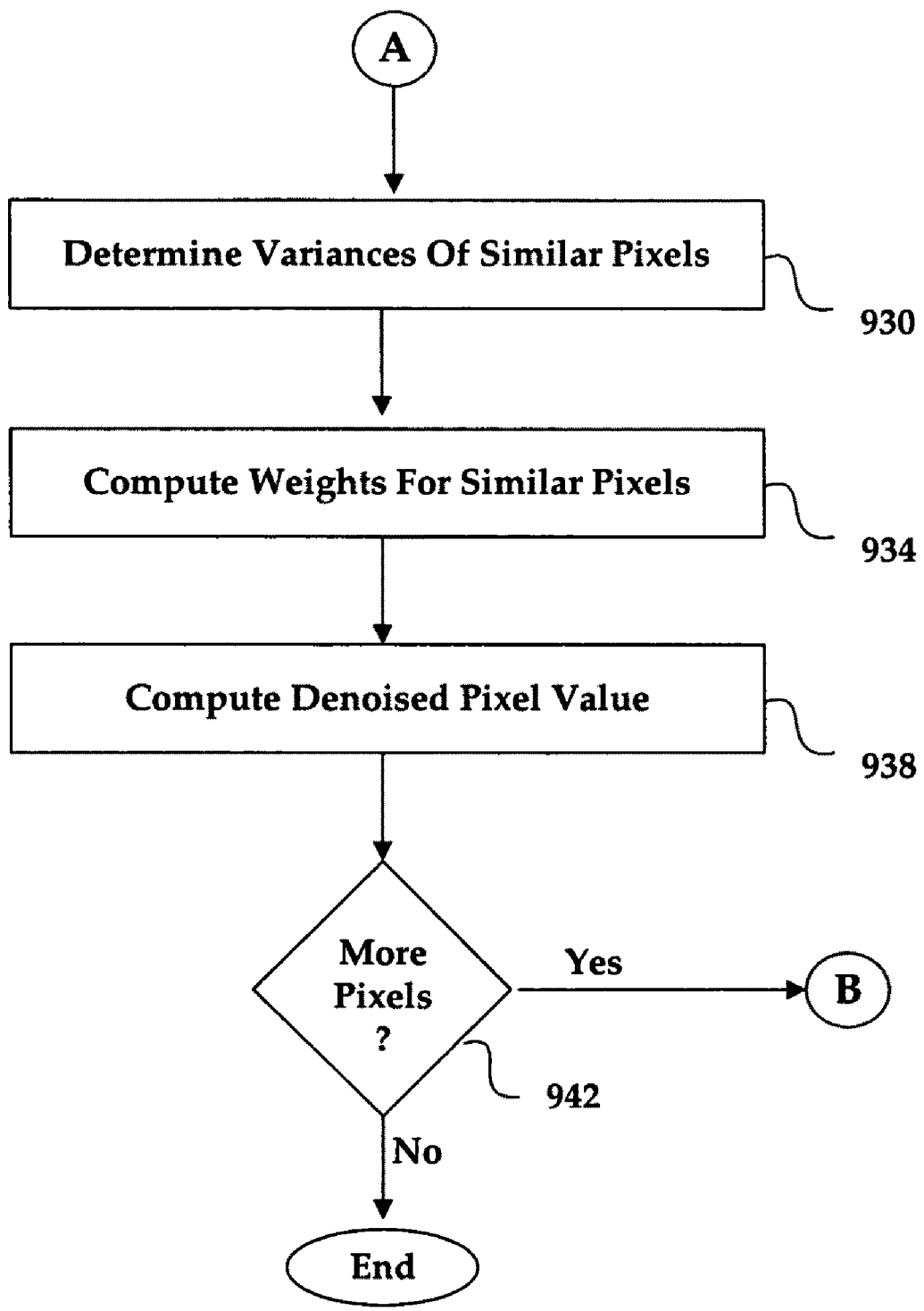

Referring now to FIGS. 9A-9B, a flowchart of method steps for performing an image denoising procedure is shown, in accordance with one embodiment of the present invention. The FIG. 9 embodiment is presented for purposes of illustration, and in alternate embodiments, the present invention may readily utilize steps and sequences other than certain of those steps and sequences discussed in conjunction with the FIG. 9 embodiment.

In step 914 of the FIG. 9A embodiment, a denoising manager 416 initially accesses image data from any appropriate data source for performing the image denoising procedure. In step 918, denoising manager 416 selects a target pixel for the denoising procedure. In step 922, denoising manager 416 defines a processing window around the selected target pixel. In step 926, denoising manager 416 identifies pixels within the processing window that are similar to the target pixel according to any effective criteria. For example, denoising manager 416 may require pixel values to be within a predefined range of the pixel value of the target pixel. The FIG. 9A process then advances to step 930 of FIG. 9B through connecting letter "A."

In step 930 of the FIG. 9B embodiment, denoising manager 416 determines the respective variance values of the similar pixels within the processing window by utilizing any effective techniques. For example, in certain embodiments, denoising manager 416 obtains the variance values from a lookup table 420 (FIG. 7) that is based upon a noise model 612 (FIG. 6). In step 934, denoising manager 416 computes respective signal-dependent weighting values for the similar pixels in any appropriate manner. For example, in certain embodiments, a weighting value may be equal to the reciprocal of a variance value from a corresponding pixel.

In step 938, denoising manager 416 applies the weighting values to corresponding raw pixel values to compute a denoised pixel value for the target pixel. In certain embodiments, the denoised pixel value is equal to an averaged summation of each similar pixel value multiplied by a corresponding weighting value. In step 942, denoising manager 416 determines whether additional pixels remain for the denoising procedure. If additional pixels remain for denoising, then the FIG. 9B process returns to step 918 of FIG. 9A to denoise all remaining pixels in the image. Alternately, if all pixel have been denoised, then the FIG. 9 process may terminate.

The FIG. 9 embodiment is presented in the context of an electronic camera device 110 (FIG. 1) performing the image denoising procedure. However, in alternate embodiments, image denoising procedures may also be performed in accordance with the present invention in environments that are external to a digital camera. For example, a computer device may utilize principles of the present invention for performing image denoising procedures after the initial capture of the raw image data. The present invention therefore provides an improved system and method for effectively performing an image denoising procedure.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image denoising procedure, comprising:
    an imaging device that captures image data corresponding to a photographic target;

a denoising manager that identifies similar pixels from said image data, said denoising manager computing weighting values that correspond to noise variance characteristics of respective ones of said similar pixels, said denoising manager calculating denoised pixel values by utilizing said weighting values in conjunction with raw pixel values of only said similar pixels from said image data.

2. The system of claim 1 wherein said denoising manager defines a target pixel for performing an iteration of said image denoising procedure.

3. The system of claim 2 wherein said denoising manager defines a processing window for performing said iteration of said image denoising procedure.

4. The system of claim 3 wherein said similar pixels are located within said processing window.

5. The system of claim 3 wherein said processing window encompasses a pixel array that is a pre-defined subset of said image data.

6. The system of claim 5 wherein said target pixel is centered within said pixel array of said processing window.

7. The system of claim 3 wherein said similar pixels have corresponding similar pixel values that are within a predetermined range of a target pixel value of said target pixel.

8. The system of claim 1 wherein raw pixels from said image data include noise components that are removed by performing said image denoising procedure.

9. The system of claim 3 wherein said denoising manager determines noise variance values corresponding to said similar pixels.

10. The system of claim 9 wherein said noise variance values are equal to corresponding noise deviation values raised to the second power.

11. The system of claim 9 wherein said noise variance values are defined by a noise model that relates said raw pixel values to corresponding ones of said variance values.

12. The system of claim 11 wherein a lookup table is created to store said raw pixel values and said corresponding ones of said variance values.

13. The system of claim 12 wherein said denoising manager refers to said lookup table to obtain said variance values without performing a corresponding calculation procedure.

14. The system of claim 9 wherein said denoising manager computes said weighting values as being equal to reciprocals of said variance values.

15. The system of claim 9 wherein said variance values are expressed by a formula:

$$\alpha_i = \frac{1}{\sigma_i^2}$$

where $\alpha_i$ is one of said weighting values, and $\sigma_i^2$ is a corresponding one of said variance values.

16. The system of claim 14 wherein said denoising manager calculates said denoised pixel values as being equal to an averaged summation of said raw pixel values multiplied by corresponding ones of said weighting values.

17. A system for performing an image denoising procedure, comprising:
an imaging device that captures image data corresponding to a photographic target;
a denoising manager that identifies similar pixels from said image data, said denoising manager computing weighting values that correspond to respective ones of said similar pixels, said denoising manager calculating denoised pixel values by utilizing said weighting values in conjunction with raw pixel values from said image data, said denoising manager defining a target pixel from performing an iteration of said image denoising procedure, said denoising manager defining a processing window for performing said iteration of said image denoising procedure, said denoising manager determining noise variance values corresponding to said similar pixels, said variance values are expressed by a formula:

$$\alpha_i = \frac{1}{\sigma_i^2}$$

where $\alpha_i$ is one of said weighting values, and $\sigma_i^2$ is a corresponding one of said variance values, said denoised pixel values being expressed by a formula:

$$\hat{x} = \frac{1}{N} \sum_{i=1}^{\omega} \frac{y_i}{\sigma_i^2}$$

where $y_i$ is one of said raw pixel values, $\sigma_i^2$ is a corresponding one of said variance values, and N is a normalization factor.

18. The system of claim 16 wherein said denoising manager repeatedly performs said image denoising procedure on new target pixels until all of said image data has been denoised.

19. The system of claim 15 wherein said denoising manager is alternately implemented on either of said image device or an external postprocessing computer.

20. A method for performing an image denoising procedure, comprising:
providing an imaging device that captures image data corresponding to a photographic target; and
utilizing a denoising manager to identify similar pixels from said image data, said denoising manager computing weighting values that correspond to noise variance characteristics respective ones of said similar pixels, said denoising manager calculating denoised pixel values by utilizing said weighting values in conjunction with raw pixel values from said image data.

* * * * *